(12) United States Patent
Eldering

(10) Patent No.: US 8,581,873 B2
(45) Date of Patent: *Nov. 12, 2013

(54) ELASTOMERIC WAVE TACTILE INTERFACE

(75) Inventor: Charles A. Eldering, Furlong, PA (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,837

(22) Filed: Aug. 2, 2012

(65) Prior Publication Data

US 2012/0293441 A1    Nov. 22, 2012

Related U.S. Application Data

(63) Continuation of application No. 12/396,787, filed on Mar. 3, 2009, now Pat. No. 8,253,703.

(51) Int. Cl.
G06F 3/041 (2006.01)

(52) U.S. Cl.
USPC .......................................................... 345/173

(58) Field of Classification Search
None
See application file for complete search history.

(56) References Cited

U.S. PATENT DOCUMENTS

| | | | |
|---|---|---|---|
| 5,389,849 A | 2/1995 | Asano et al. | |
| 5,685,721 A | 11/1997 | Decker | |
| 6,636,202 B2 | 10/2003 | Ishmael et al. | |
| 6,703,924 B2 | 3/2004 | Tecu et al. | |
| 7,103,407 B2 | 9/2006 | Hjelt et al. | |
| 7,148,875 B2 | 12/2006 | Rosenberg et al. | |
| 7,375,454 B2 | 5/2008 | Takasaki | |
| 7,609,178 B2 | 10/2009 | Son | |
| 8,115,745 B2 | 2/2012 | Gray | |
| 2002/0177471 A1 | 11/2002 | Kaaresoja et al. | |
| 2007/0016425 A1 | 1/2007 | Ward | |
| 2008/0122797 A1 | 5/2008 | Soh et al. | |
| 2009/0115734 A1 | 5/2009 | Fredriksson et al. | |
| 2010/0079410 A1 | 4/2010 | Minton | |

FOREIGN PATENT DOCUMENTS

JP    11-203025    7/1999

*Primary Examiner* — Nicholas Lee
(74) *Attorney, Agent, or Firm* — Moritt Hock & Hamroff LLP; Steven S. Rubin, Esq.

(57) ABSTRACT

A tactile interface includes a plurality of individually controllable drivers positioned about a perimeter of a tensioned elastomeric material. Each driver includes a first electrode, a second electrode, and a piezoelectric material. A top surface of the first electrode is coupled to the tensioned elastomeric material. The piezoelectric material is disposed between a top surface of the second electrode and a bottom surface of the first electrode. Driver circuitry can apply control information to each of the plurality of individually controllable drivers to produce a wave pattern in the tensioned elastomeric material. Some example methods of providing a tactile image on a tactile interface include producing a time-varying potential difference across the top electrode and the bottom electrode of the drivers so that a standing wave pattern can be created in the elastomeric material. The tactile image can be formed by modulating a subset of the plurality of drivers.

19 Claims, 11 Drawing Sheets

ELASTOMERIC WAVE TACTILE INTERFACE

CROSS REFERENCE TO RELATED APPLICATION

This application is a continuation of U.S. patent application Ser. No. 12/396,787, filed Mar. 3, 2009 now U.S. Pat. No. 8,253,703, entitled *Elastomeric Wave Tactile Interface*, the entire disclosure of which is incorporated herein by reference.

This application is related to U.S. patent application Ser. No. 12/396,777, filed Mar. 3, 2009 (now U.S. Pat. No. 8,077, 021), entitled *Dynamic Tactile Interface*.

BACKGROUND

The present disclosure generally relates to tactile interfaces, and more specifically to tactile interfaces using a tensioned elastomeric material.

Tactile interfaces are becoming increasingly important as computing, communications, and gaming platforms proliferate and as their capabilities increase. Developers are continually looking for additional ways to convey information and for novel and differentiating human interfaces.

BRIEF DESCRIPTION OF THE DRAWINGS

The following detailed description will be better understood when read in conjunction with the appended claims, taken in conjunction with the accompanying drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
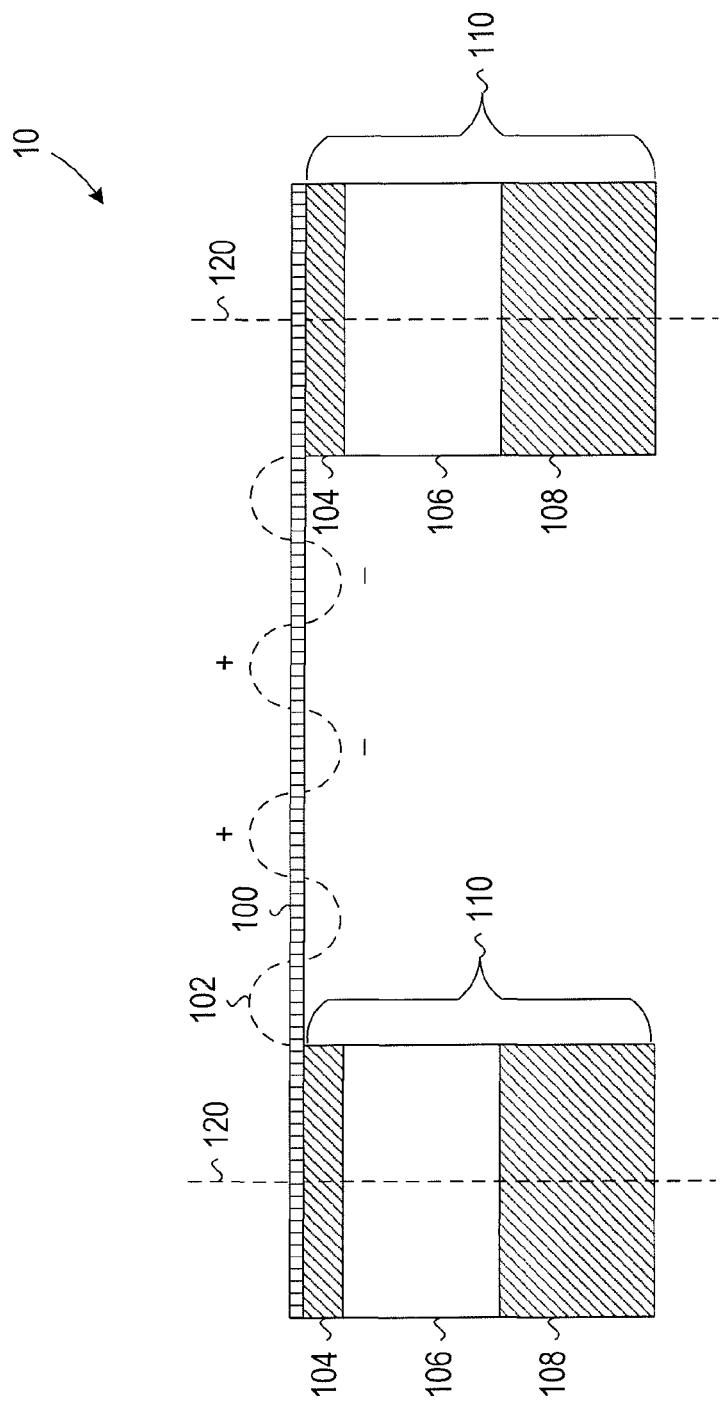
FIG. 1 is a cross-sectional view illustrating an elastomeric wave tactile interface.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the multiple embodiments of the present disclosure include a tactile interface including a tensioned elastomeric material. In some examples, a plurality of individually controllable drivers can be positioned around the perimeter of the tensioned elastomeric material, each driver includes a first electrode, where a top surface of the first electrode being attached to the tensioned elastomeric material, a second electrode, and a piezoelectric material, the piezoelectric material being disposed between a top surface of the second electrode and a bottom surface of the first electrode. Driver circuitry can be arranged to apply control information for each of the plurality of individually controllable drivers to produce at least one wave pattern in the tensioned elastomeric material.

Methods of providing a tactile image on a tactile interface are also described, wherein example tactile interfaces comprise an elastomeric material and a plurality of individually controllable piezoelectrically activated drivers, each of the individually controllable piezoelectrically activated drivers comprising a top electrode, a bottom electrode, and a piezoelectric material, includes providing a time varying potential difference across the top electrode and the bottom electrode of the plurality of individually controllable piezoelectrically activated drivers positioned around the perimeter of the elastomeric material forming a standing wave pattern in the elastomeric material responsive to the time varying potential difference, where the standing wave pattern can be produced in response to driving the drivers using at least one of a steady state oscillation frequency and harmonics of the steady state oscillation frequency. A subset of the plurality of drivers is modulated at an oscillation frequency different from the steady state oscillation frequency and the harmonics of the steady state oscillation frequency to form the tactile image.

Figure 9:
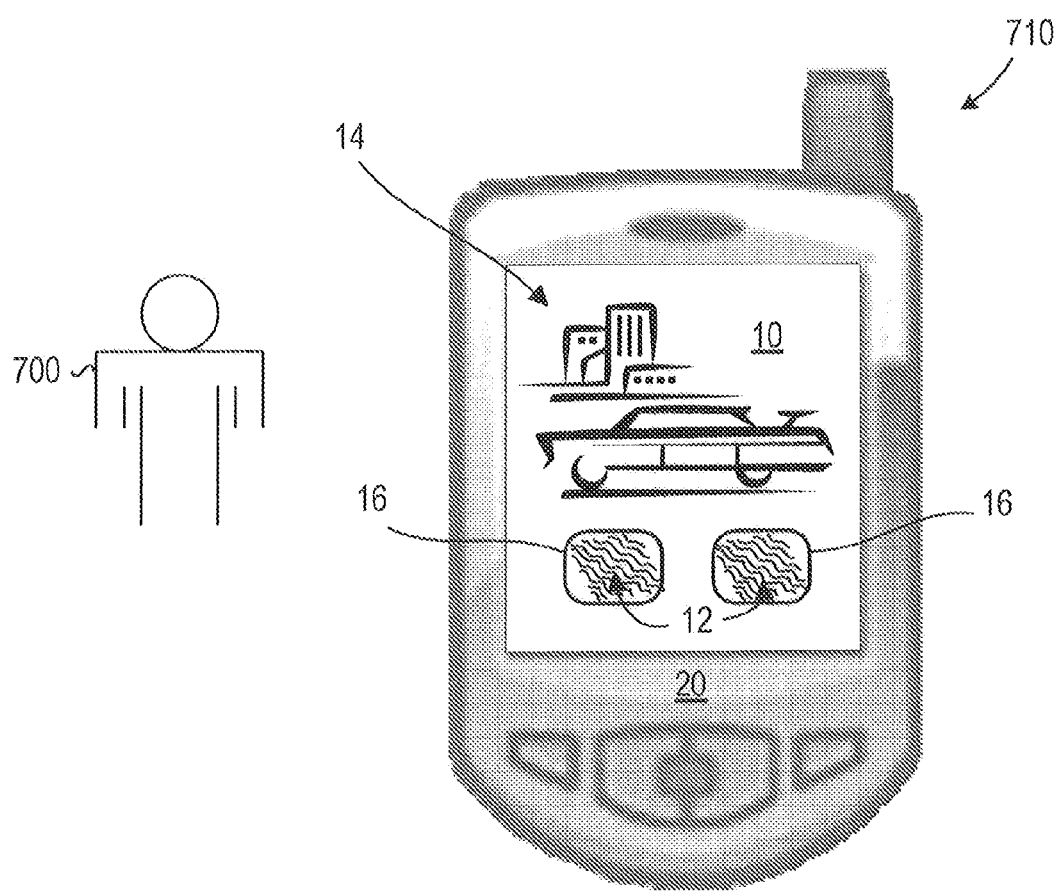
FIG. 9 is a block diagram illustrating an electronic device including embodiments of elastomeric wave tactile interfaces.

FIG. 9 is a block diagram illustrating an electronic device 710 including the elastomeric wave tactile interface 10 of the present disclosure. The elastomeric wave tactile interface 10 can be configured to allow a visual image 14 or visual features 16 within the visual image 14 to be presented to a user 700 of the electronic device through their sense of touch by forming a tactile image 12 on the elastomeric wave tactile interface 10. The elastomeric wave tactile interface 10 may enhance the user experience by creating a tactile sensation using standing or travelling waves in specific areas of an elastomeric material of the elastomeric wave tactile interface 10 where tactile feedback is beneficial. The elastomeric wave tactile interface 10 can be implemented as part of a viewable display type of device, or as a device without any viewable display. In some embodiments, a tactile image or portion of a tactile image corresponding to a visual image 14 is presented through the elastomeric wave tactile interface 10. For example, in order to improve the accuracy of finger-based text entry, a tactile sensation is provided to the user in certain areas of the elastomeric wave tactile interface 10 that correspond to areas of a displayed image that require tactile feedback. In some embodiments, the elastomeric wave tactile interface 10 presents information that is not intended for visual display, such as Braille or other information that is only to be presented by a tactile interface.

In the case of an image that can be presented for visual display, a portion of the image, such as a scene, background, component of the image (e.g., floor, ground) may be presented through the tactile interface. In some embodiments the user views a visual image while information corresponding to the visual image (e.g., surfaces or particular information in the visual image) is presented through the elastomeric wave tactile interface 10. A processor in combination with the appropriate software can be configured to determine what portions of the visual image are to be interpreted or selected for tactile display through the elastomeric wave tactile interface 10.

Figure 7:
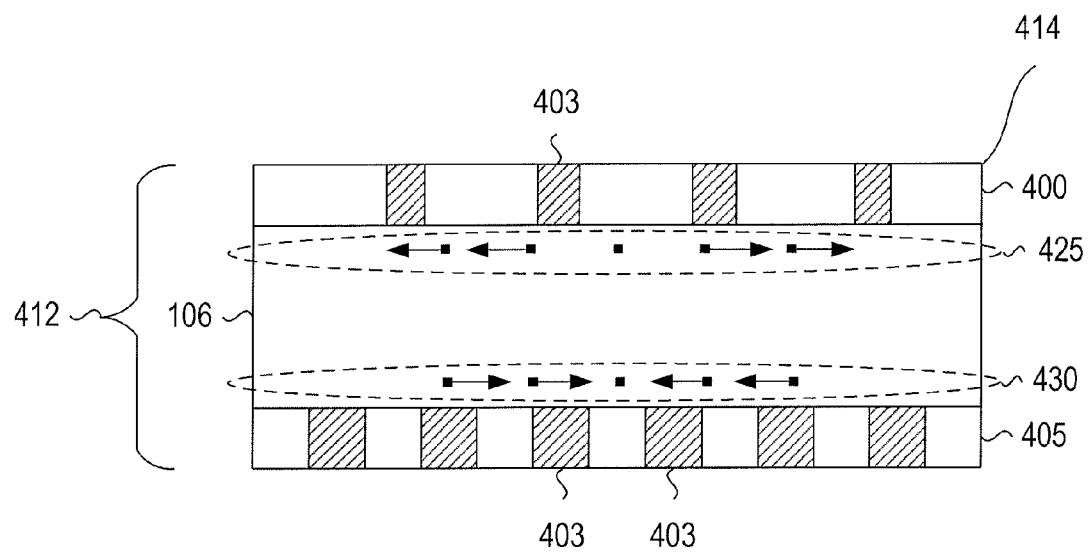
FIG. 7 is a side view illustrating the piezo-electrode structure of the alternate driver of the elastomeric wave tactile interface of FIG. 4.

In some embodiments, the displayed visual image is, for example, a graphical user interface between the user and an electronic device. That is, as illustrated in FIG. 7, the elastomeric wave tactile interface 10 can be used to form at least a part of the user interface (UI) 20 between the user 700 and the electronic device 710. During operation of the electronic device 710, the displayed visual image 14 may change, in response to detecting a user interaction with the dynamic tactile interface, thus creating different areas of the elastomeric wave tactile interface 10 that provide opportunity for tactile feedback. For example, the visual image 14 may be a web page that includes buttons, links or other indicia 16 for selection or "clicking" by a user. The areas of these indicia 16 on the visual image 14 are the areas of tactile feedback on the elastomeric wave tactile interface 10 for which increased accuracy or ease of use may be desired.

The elastomeric wave tactile interface 10 may be implemented in, on, or in conjunction with any electronic device 710 having or utilizing a visual or touch sensitive display (e.g., computer, laptop, video game console, personal digital assistant, mobile phone, mobile media player, other touch screen interfaces, etc.) in order to convey a tactile sensation corresponding to the visual information presented on a display of the electronic device 710. In some embodiments, the elastomeric wave tactile interface 10 can be implemented in or as part of the touch screen interface of a mobile phone. In some additional embodiments, the elastomeric wave tactile interface 10 can be implemented in a tactile keyboard and provides tactile feedback in areas of a keyboard where the keys are normally located. In some other embodiments, the elastomeric wave tactile interface 10 can be implemented in a non-viewable part of a device, such as in the touchpad of a laptop computer and provides tactile feedback, for example, in the areas of the touchpad that represent the left and right mouse buttons.

FIG. 1 is a cross-sectional view illustrating an elastomeric wave tactile interface 10 in which an elastomeric material 100 is held in a highly tensioned state between two drivers 110, in accordance with embodiments of the present disclosure. Each driver 110 of the elastomeric wave tactile interface 10 includes a piezoelectric material 106 arranged in electrical communication with a bottom electrode 108 and a top electrode 104. As shown in FIG. 1, the geometric centers of the electrodes 104, 108 and the piezoelectric material 106 are generally aligned along an axis 120 orthogonal to the surface of the elastomeric wave tactile interface 10. The elastomeric material 100 is attached, in a tensioned state, to the top electrode 104. When a potential difference (i.e., a voltage) is applied across the top electrode 104 and bottom electrode 108, the piezoelectric material 106 deforms along the axis 120 that is generally perpendicular to the surface of the electrodes 104, 108. The deformation may be an expansion or contraction (not shown) of the piezoelectric material 106 in a direction parallel to the axis 120 (i.e., normal to the surface of the electrodes), depending on the type of piezoelectric material 106 and the polarity of the applied voltage. When the voltage is removed, the elastomeric material 106 relaxes back to an undeformed state.

The elastomeric material 100 can be formed from any number of elastomeric materials including, but are not limited to, silicone rubber, natural rubber, polybutadiene, nitrile rubber, and other unsaturated and saturated rubbers, as well as elastomers. The elastomeric material 100 is maintained in a highly tensioned state, described in greater detail below, in order to achieve the standing wave patterns that create appropriate textures and patterns.

The piezoelectric materials 106 utilized in the elastomeric wave tactile interface 10 include piezoelectric ceramics, piezoelectric crystals, or any other material that exhibits piezoelectric properties, where the piezoelectric materials 106 and their responses to an applied electric field (caused, for example by a potential difference between two electrodes, as described herein) are understood to those of skill in the art having read the present disclosure.

The repeated switching between on and off conditions for applying the voltage across the electrodes 104, 108 (i.e., applying a time varying potential difference), hereafter referred to as driving the piezoelectric material 106 causes a repeated deformation and relaxation of the pieozoelectric material 106 resulting from the time varying potential difference across the electrodes (e.g., the piezoelectric material 106 deforms when the voltage is "on", and relaxes when the voltage is "off").The rate of the on/off cycle of a driver 110 is referred to as the driver oscillation frequency.

When utilizing a number of drivers in or around the edges or perimeters of the elastomeric material (see, for example, FIGS. 2A and 2B), the excitation of the drivers 110 caused by the voltage and/or oscillation can be used to establish a standing wave pattern in the elastomeric material 100, described in greater detail below. Referring again to FIG. 1, an example standing wave pattern 102 in the elastomeric material 100 is shown. Several peaks and troughs are denoted on the standing wave pattern 102 with a + and − sign, respectively. The locations and numbers of the peaks, troughs, and nodes (i.e., points of zero deflection) of the standing wave pattern 102 in FIG. 1 are exemplary only and should not be considered limiting.

Figure 2A:
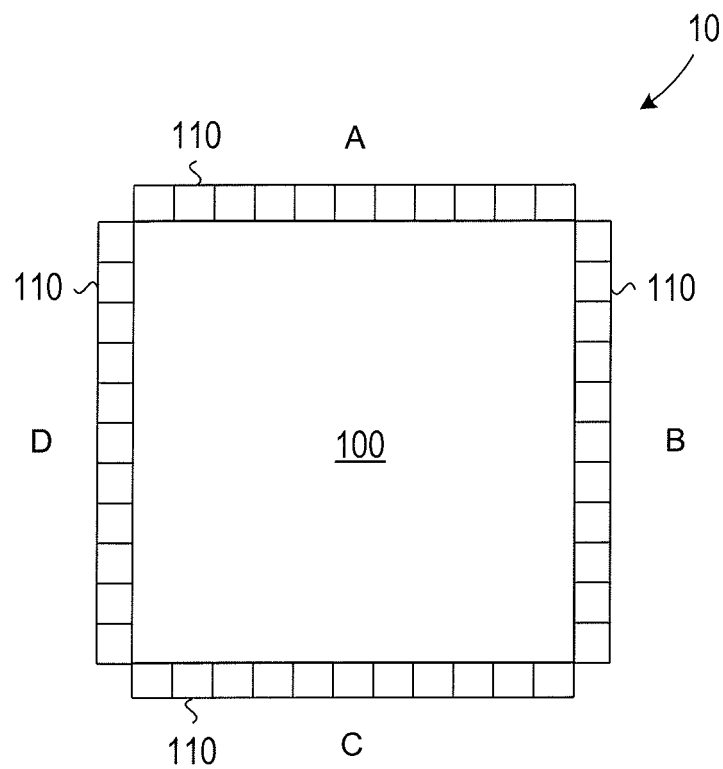
FIGS. 2A and 2B are top-down views illustrating the elastomeric wave tactile interface of FIG. 1.

FIG. 2A is a two-dimensional top-down view illustrating the elastomeric wave tactile interface 10 of FIG. 1, with the elastomeric material 100 in the undriven state (i.e., no deflection over the entire surface) in accordance with the present disclosure. In this example, drivers 110 are aligned along all four sides A, B, C, and D of the perimeter of the elastomeric material 100, such that a driver 110 on side A is paired with a driver 110 on side C, and similarly a driver 110 on side B is paired with a driver 110 on side D. The number, spacing, and location of the drivers 110 as illustrated in FIG. 2A is one illustrative example and should not be considered limiting. For example, additional or fewer drivers 110 may be used in the elastomeric wave tactile interface 10. Alternatively, the drivers 110 may be positioned or aligned in a manner different than illustrated in FIG. 2A, and need not be positioned directly abutting each other, such that the individual drivers 110 may be spaced apart from one another along any given edge of the elastomeric wave tactile interface 10. In some embodiments, the drivers 110 are non-uniformly distributed around the perimeter or edges of the elastomeric material 100. The depiction of the elastomeric wave tactile interface 10 with square shape in FIG. 2A should not be considered limiting. The perimeter of the standing wave tactile interface 10 may be square, rectangular, circular, or any other reasonable shape used in conjunction with an electronic device 710 (see FIG. 7).

Standing wave patterns can be created in the elastomeric material 100 by driving a subset of the drivers 110 at the steady state oscillation frequency or harmonics of the steady state oscillation frequency. The steady state oscillation frequency and the harmonics of the steady state oscillation frequency are the driver oscillation frequencies that produce standing wave patterns in the elastomeric material 100, corresponding to the fundamental mode and harmonic modes, respectively. Fundamental and harmonic modes of tensioned membranes are generally understood in the art and a detailed description thereof is omitted here for convenience only and should not be considered as limiting.

The steady state oscillation frequency depends on the properties of the particular elastomeric material 100, as well as the amount of stretching of the material (i.e., the steady state oscillation frequency changes as the elastomeric material is tensioned). Thus, the elastomeric material 100 is initially in a highly tensioned state, described as a condition where steady state oscillation frequency corresponding to the fundamental mode of the elastomeric material 100 is included in the operational range of driver oscillation frequencies for the drivers 110 of the elastomeric wave tactile interface 10. If the tension in the elastomeric material 100 is too low such that the steady state oscillation frequency is below the lowest driver oscillation frequency of the operational range of driver oscillation frequencies, the drivers 110 are incapable of exciting the elastomeric material 100 to produce the standing waves patterns 102 corresponding to the fundamental mode. Similarly, if the tension in the elastomeric material 100 is too high such that the steady state oscillation frequency is above the highest driver oscillation frequency of the operational range of driver oscillation frequencies, the drivers 110 are also incapable of exciting the elastomeric material 100 to produce the standing waves patterns 102 corresponding to the fundamental mode.

Figure 2B:
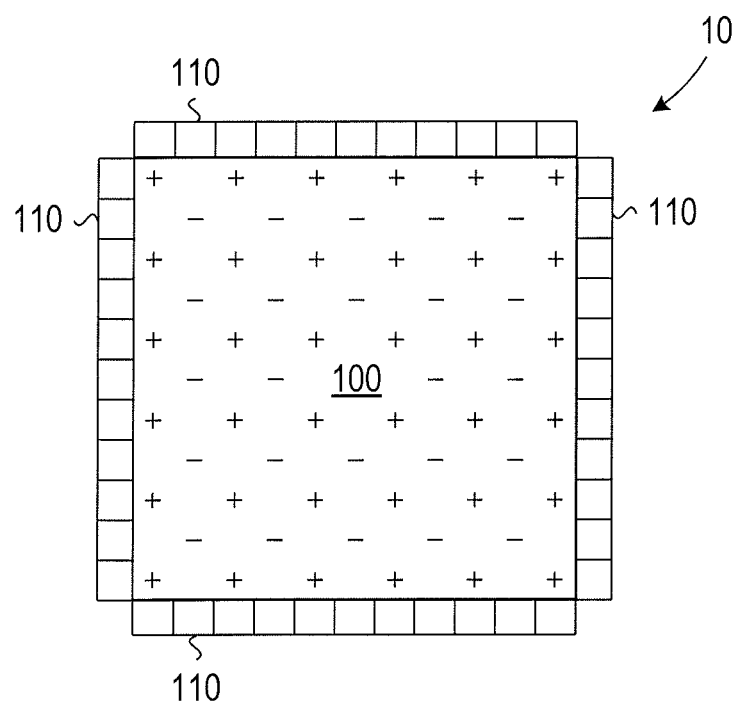

FIG. 2B is a two-dimensional top-down view illustrating the elastomeric wave tactile interface 10 of FIG. 1, with the elastomeric material 100 in the driven state in accordance with the present disclosure. In this example, the drivers 110 are driven in-phase (i.e., voltage on/off at the same time for all drivers) at a harmonic of the steady state oscillation frequency, producing a surface topography in the elastomeric material 100 of the elastomeric wave tactile interface 10 in a driven state with a standing wave pattern 102 over the full surface of the elastomeric material, where in FIG. 2B, "+" indicates peaks and "−" indicates troughs, similar to the designations used in FIG. 1.

A tactile sensor, such as a human finger, contacting the surface of the elastomeric material 100 experiences a tactile sensation from tactile features on the elastomeric wave tactile interface 10 formed by the standing wave patterns 102 in the elastomeric material 100. The tactile features caused by the pattern of peaks and troughs in the surface of the elastomeric material 100 may be larger, smaller, or nearly the same size as tactile sensor. When many tactile features are located within the area contacted by the tactile sensor(i.e., the size of the size and spacing of the tactile features is small compared to the contact area of the tactile sensor), the resulting tactile sensation on the surface of the elastomeric wave tactile interface 10 is a texture, such as rough or smooth. Conversely, if the size and/or spacing of the tactile features are large compared the contact area of the sensor, the tactile sensation provides a topographic pattern, as the tactile sensor detects the individual features as it is moved over the surface of the elastomeric wave tactile interface 10. By altering the driver oscillation frequency (i.e., changing the rate of the voltage off/on cycles) of the drivers 110, different textures or different patterns may be created on the surface of the elastomeric wave tactile interface 10. For example, when the driver oscillation frequency is increased on the drivers 110 from one of a lower harmonic of the steady state oscillation frequency to a higher order harmonic of the steady state oscillation frequency, the peak-to-peak spacing of the standing wave pattern is smaller, nominally corresponding to a smoother surface to a human finger or other tactile sensor.

Figure 3A:
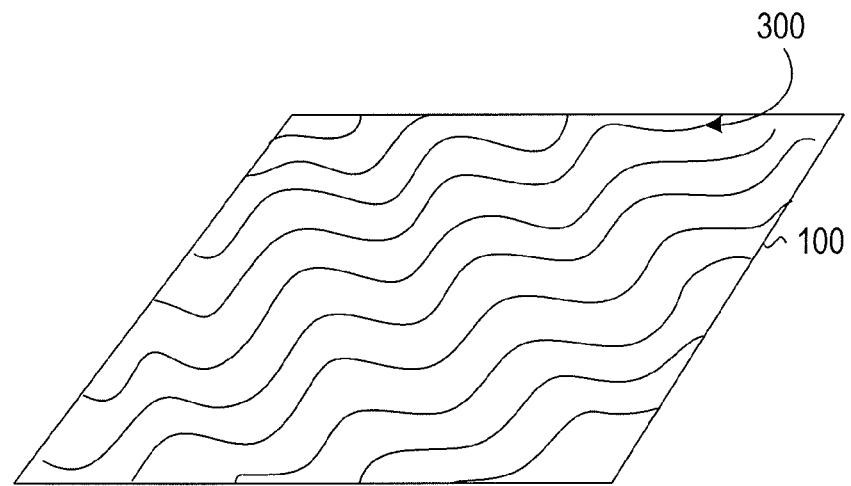
FIGS. 3A and 3B are illustrations of example standing wave patterns in accordance with the elastomeric wave tactile interface of FIG. 1.
Figure 3B:
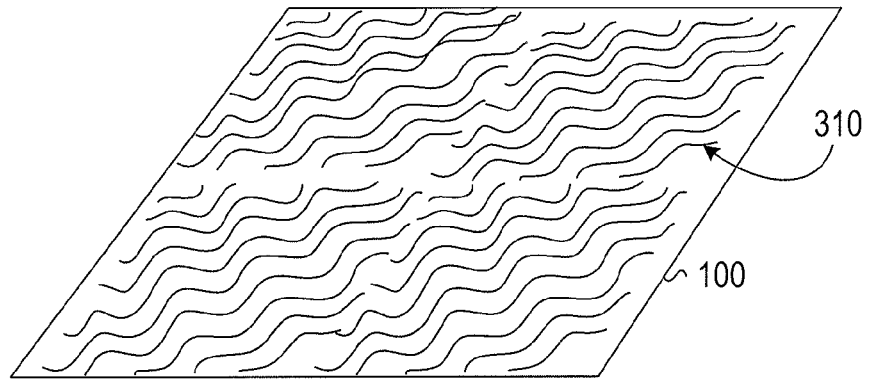

FIGS. 3A and 3B are illustrations of example standing wave patterns in accordance with the elastomeric wave tactile interface 10 of FIG. 1. Referring to FIG. 3A, an example standing wave pattern 300 is produced using a lower order harmonic of the steady state oscillation frequency, In FIG. 3B an example standing wave pattern 310 is produced using a higher order harmonic of the steady state oscillation frequency. The standing wave patterns 300, 310 need not be aligned with the sides of the elastomeric wave tactile interface 10, but may be oriented diagonally with respect to the sides, as illustrated in FIGS. 3A and 3B, or in any other orientation.

Figure 10:
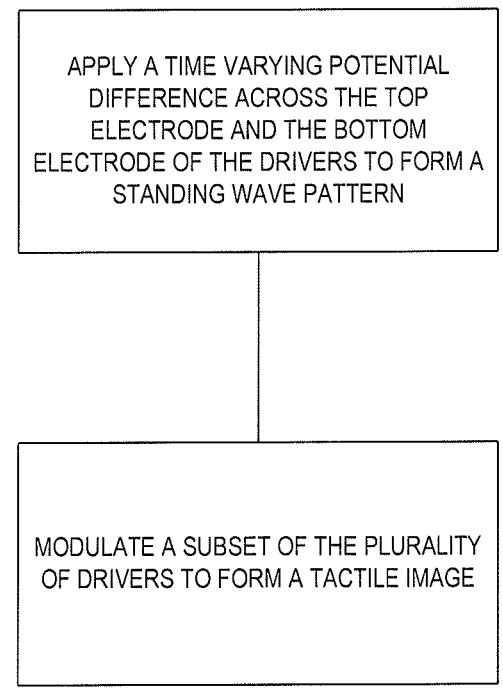
FIG. 10 is a flow diagram illustrating an example process for providing a tactile image for embodiments of elastomeric wave tactile interfaces.

FIG. 10 is a flow diagram illustrating an example process for providing a tactile image for embodiments of elastomeric wave tactile interfaces arranged in accordance with the present disclosure. Each of the drivers 110 of the elastomeric wave tactile interface 10 is individually controllable through a control circuit, described in greater detail below, so that tactile images can be formed in the elastomeric material 100 in localized patterns. A time-varying potential difference is applied across the top electrode 104 and bottom electrode 106 of the drivers 110 forming a standing wave pattern in the elastomeric material 106, as described above. By independently modulating the steady state and/or harmonic frequencies of one or more of the drivers 110 (i.e., a subset of drivers 110) using driving frequencies that are different than the steady state and/or harmonic frequencies, tactile images are formed at one or more locations on the surface of the elastomeric wave tactile interface 10. The elastomeric wave tactile interface 10 can be implemented as part of a viewable display type of device, or as a device without any viewable display.

Figure 4:
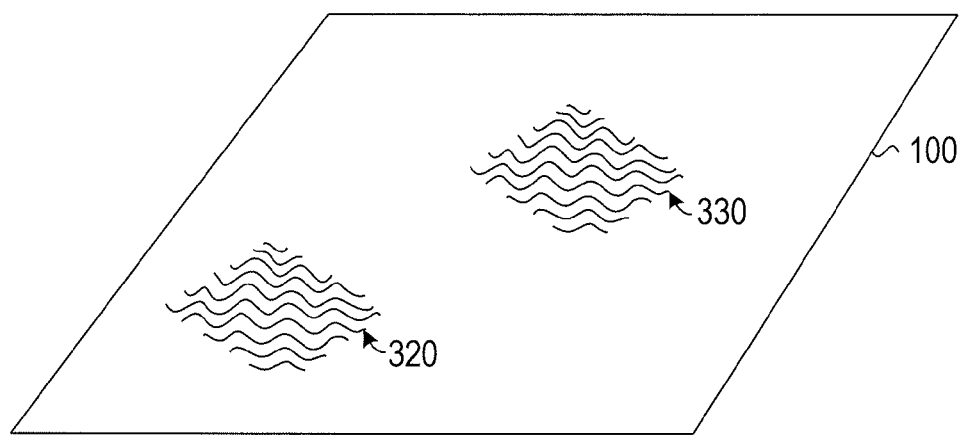
FIG. 4 is an illustration of example tactile images in accordance with the elastomeric wave tactile interface of FIG. 1.

FIG. 4 is an illustration of example tactile images in accordance with the elastomeric wave tactile interface of FIG. 1. As illustrated by FIG. 4, example tactile images 320, 330 can be formed by separate, localized regions of peaks and troughs in the elastomeric material 100, while the surface of the surrounding areas may remain generally flat. Modulation of the steady state and/or harmonic frequencies of an appropriate subset of drivers 110 may also produce an effective cancellation of the standing wave patterns in certain areas, while leaving the standing wave patterns in other areas unaffected. In some examples, the tactile images are statically positioned on the elastomeric wave tactile interface 10, while in other embodiments the tactile images can be dynamically positioned.

Dynamically positioned tactile images are not stationary on the elastomeric wave tactile interface 10, and instead may change position on the surface of the elastomeric wave tactile interface 10. These dynamic tactile images are travelling waves in the elastomeric material 100 conveying a sense of motion to a tactile sensor in contact with the elastomeric wave tactile interface 10. FIG. 4 is an exemplary illustration of tactile images in accordance with the elastomeric wave tactile interface 10 of FIG. 1. Referring again to FIG. 4, a tactile image 320 may be formed at a first location (e.g., a particular portion of the interface) at a first time, while the tactile image 330 may be formed at a second location at a second time. In this example, both tactile images 320, 330 produce generally the same tactile sensation, just at different locations on the elastomeric wave tactile interface 10 at different times.

In some additional embodiments, an example electronic device includes an elastomeric wave tactile interface 10 superimposed on a visual display. The tactile images produced correspond to the visual image produced on a visual display. In one static example, a visual image of symbols on an input device (e.g., a keypad, a keyboard, arrow keys, etc) might be presented on the visual display while the texture of the buttons on the input device (e.g., an outline of a key, a detent or registration dot for a key, etc) for the input device might be presented on the tactile interface. In dynamic examples the tactile images change coincident with motion within the visual image. For example, a dynamic tactile image may be formed corresponding to a cursor on the visual display. As the cursor moves around the visual display, the dynamic tactile image associated with the cursor moves concurrently on the elastomeric wave tactile interface 10. As another example, for a dynamic tactile image formed on the elastomeric wave tactile interface 10 for a visual motion image of waves propagating in a body of water, such as a lake or the ocean, the contact of a human finger with the surface of the elastomeric waver tactile interface 10 provides a tactile sensation of the motion of the waves corresponding to the visualization of the motion for the user 700 (e.g., the user 700 can both see and "feel" the movement of the waves through optical and tactile interaction, respectively, with an electronic device 710 including the elastomeric wave tactile interface 10).

Figure 5:
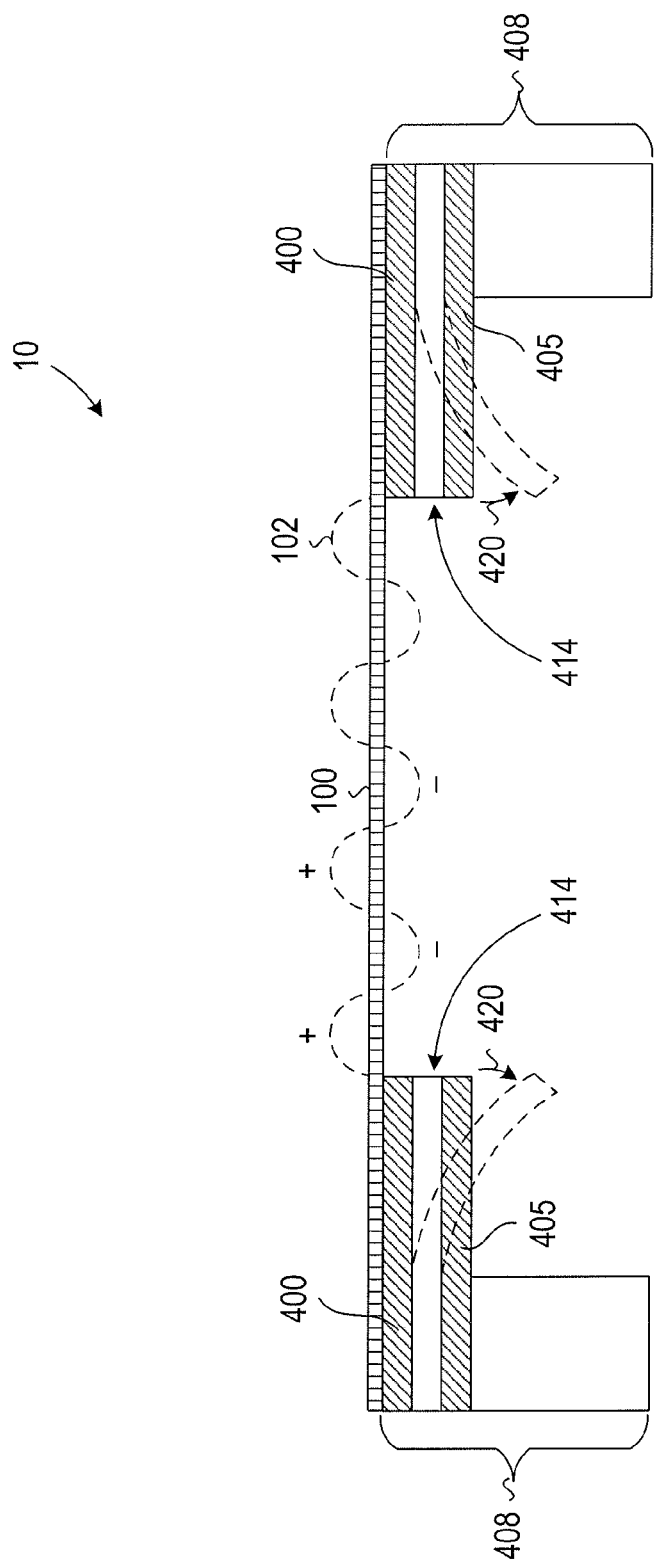
FIG. 5 is a cross-sectional view illustrating an alternate embodiment of the elastomeric wave tactile interface.
Figure 6:
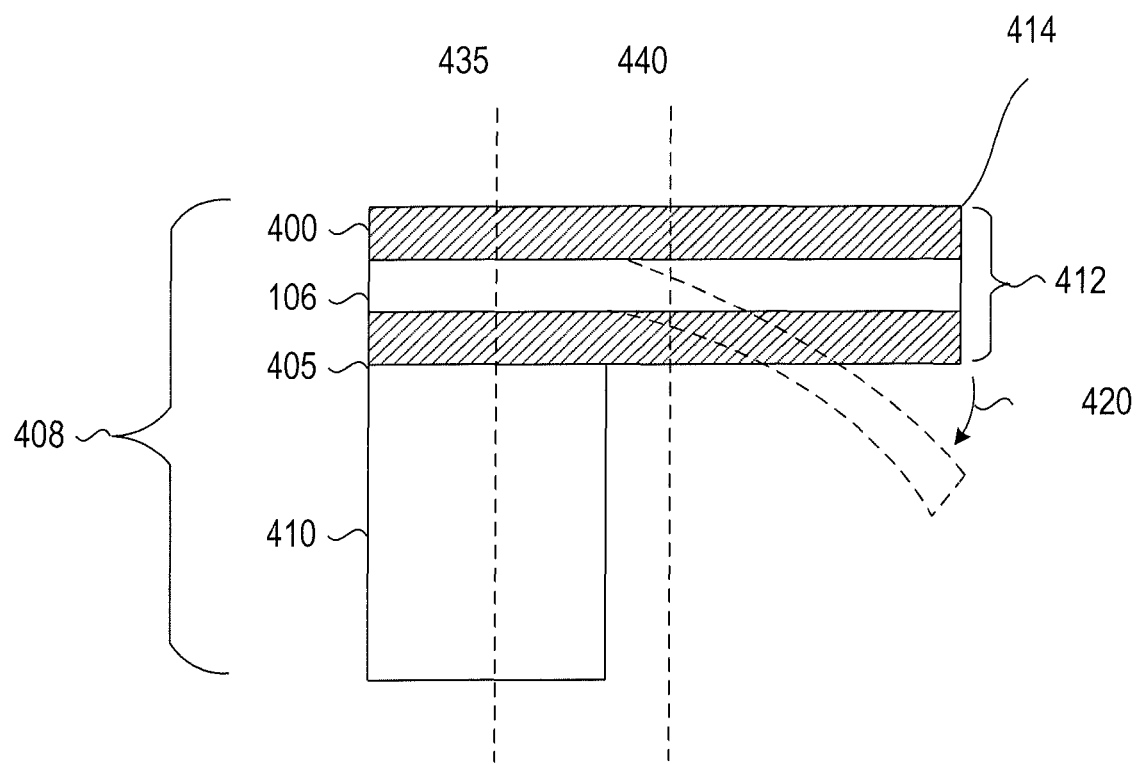
FIG. 6 is a side view illustrating an alternate driver of the elastomeric wave tactile interface of FIG. 4.

FIG. 5 is a cross-sectional view illustrating an alternate embodiment of the elastomeric wave tactile interface 10 that includes an alternate driver 408. FIG. 6 is a side view illustrating the alternate driver 408 of the elastomeric wave tactile interface 10 of FIG. 5. Referring to FIGS. 5 and 6, the alternate driver 408 in which a cantilevered deformation action is utilized as opposed to an axial driving motion used in the embodiment described with respect to FIG. 1. A piezoelectric material 106 is arranged in electrical communication with a top patterned electrode 400 and bottom patterned electrode 405 forming a piezo-electrode structure 412. The example alternate driver 408 also includes a base 410 supporting the piezo-electrode structure 412. The base may be formed using any electrically and vibrational insulating material. In some embodiments, the supporting base 410 is formed using more than one material to provide electrical and vibration isolation of the piezo-electrode structure 412 from the electronic device 710. The piezo-electrode structure 412 is coupled to the base 410 in a cantilevered manner, such that an axis 435 through the center of the base 410 is offset from an axis 440 through the center of the piezo-electrode structure 412, allowing oscillation of the cantilevered end 414 of the piezo-electrode structure 412. The orientation of the piezoelectric material 106 in the piezo-electrode structure 412 is such that the deformations produced by an applied electric field is parallel to the surface of the top patterned electrode 400 and also parallel to the bottom patterned electrode 405. A cantilevered action or displacement 420 is produced by creating an expansive stress on the top surface of the piezoelectric material 106 using the top patterned electrode 400 and a compressive stress on the opposite (bottom) surface of the piezoelectric material 106 using the bottom patterned electrode 405.

FIG. 7 is a side view illustrating the piezo-electrode structure 412 of the alternate driver 408 of the elastomeric wave tactile interface 10 of FIG. 5. The piezo-electrode structure 412 includes the piezo-electric material 106, and top and bottom patterned electrodes 400, 405. The top and bottom patterned electrodes 400, 405 each include a pattern of electrode elements 403 that are arranged to produce localized electric fields deforming the piezoelectric material 106 near the surface in contact with the respective patterned electrodes 400, 405 such that the deformation of the piezoelectric material 106 is parallel to the surfaces of top and bottom patterned electrodes 400, 405. The area 425 just under the top electrode 400 elongates due to expansive stress in the piezoelectric material 106, while the area 430 just above the bottom patterned electrode 405 contracts due the compressive stress in the piezoelectric material 106. Since one side of the piezo-electrode structure 412 is fixed to the base 410, the combined action of the expansive and compressive stresses results in a bending at the cantilevered end 414 of the piezoelectric material 106 towards the surface of the compressive stress as indicated by the arrow 420 in FIGS. 5 and 6. By driving each of the alternate drivers 408 at the steady state oscillation frequency or harmonics of the steady state oscillation frequency, a standing wave pattern is created in the elastomeric material 106, as previously described. By controlling each of the alternate drivers 408 via an appropriate row driver 540 or column driver 530, modulation of the oscillation frequencies of the alternate drivers 408 is used for the formation of tactile images in the elastomeric material 100, as described above with respect to the elastomeric wave tactile interface 10.

Figure 8:
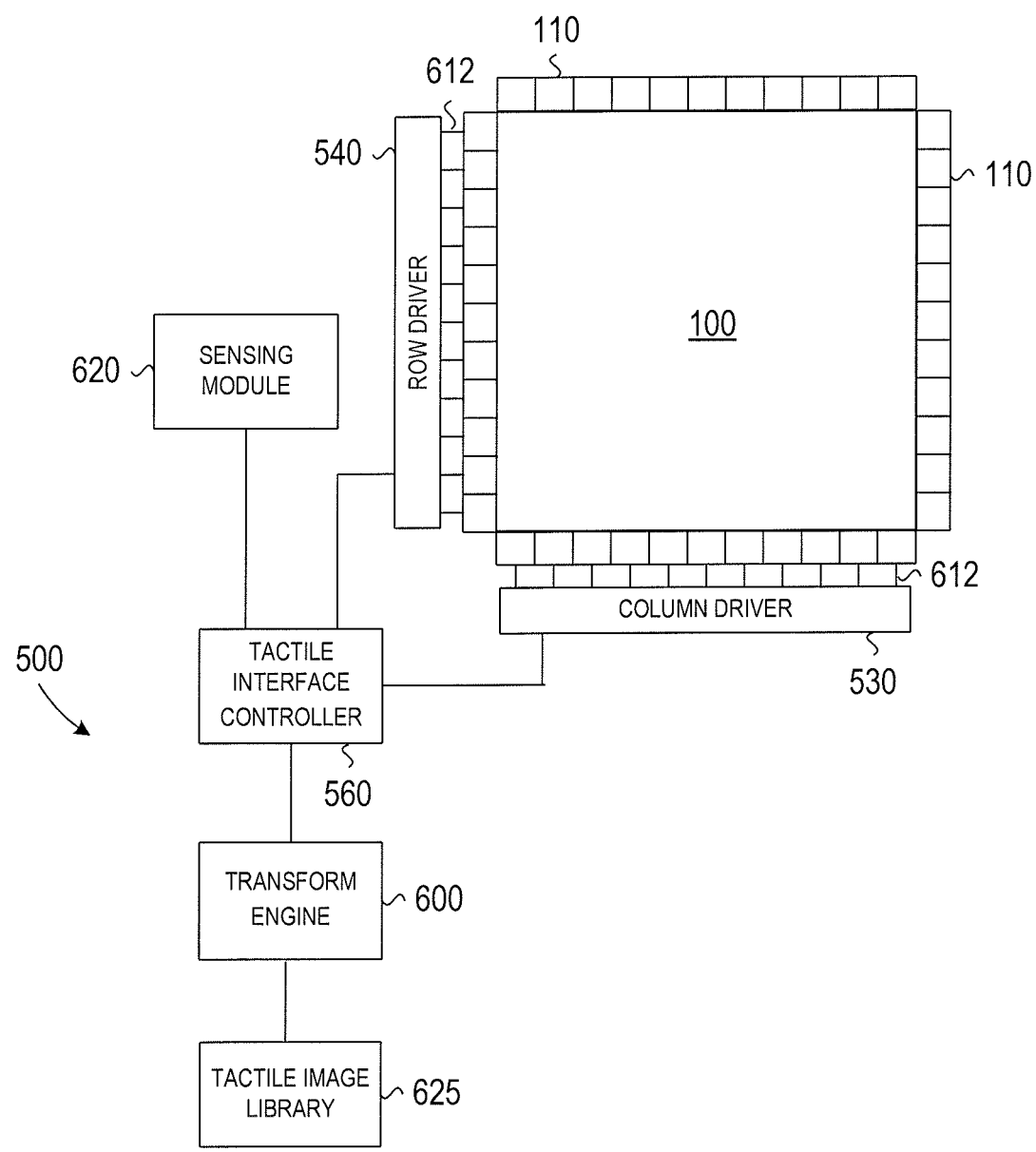
FIG. 8 is a block diagram illustrating electronic control circuitry for multiple embodiments of elastomeric wave tactile interfaces.

FIG. 8 is a block diagram illustrating electronic control circuitry for multiple embodiments of elastomeric wave tactile interfaces 10 of the present disclosure. The control circuitry 500 may include a row driver 540, a column driver 530, a tactile interface controller 560, a transform engine 600, a tactile image library 625, and a sensing module 620. A column driver 530 is electrically coupled 612 to the top and bottom electrodes 104, 108 (see FIG. 1) of each of the drivers 110 along the bottom edge of the elastomeric tactile standing wave interface 10. A row driver 540 is electrically coupled 612 to the top and bottom electrodes 104, 108 (see FIG. 1) of each of the drivers 110 along the left edge of the elastomeric tactile standing wave interface 10. Similar column and row drivers (not shown) are used along the top and right edges, respectively, of the elastomeric wave tactile interface 10. Structure and operation of the column drivers 530 and row drivers 540 should be understood to those of skill the art having read the present disclosure, and a detailed description thereof is omitted here for convenience only and should not be considered as limiting. Each of the column drivers 530 and row drivers 540 is coupled to a tactile interface controller 560. The tactile interface controller 560 provides control information for each of the drivers 110 so that the respective column and row drivers 530, 540 are controlled to dynamically form standing wave patterns and tactile images on the elastomeric wave tactile interface 10. The control information may include one or more of a driver oscillation frequency, a driver phase, and/or driver electrode voltages, all of which can collectively affect the amount of deformation of the piezoelectric material 106 (see FIG. 1), and ultimately the amount of deflection or aberration at the edges of the elastomeric material 100 near the attachment point to the drivers 110.

The tactile interface controller 560 can be configured to receive the desired control information from a transform engine 600. The transform engine 600 can be arranged to determine the control information requirements for each of the drivers 110 to produce the desired standing wave patterns or tactile images on the elastomeric wave tactile interface 10. In some examples, the transform engine 600 may utilize control information stored in a tactile image library 625 in a storage module, database or other storage medium. The tactile image library 625 may include control information for frequently used wave patterns or tactile images, such as tactile images corresponding to actuators, such as buttons, on a keyboard or keypad for different remote controls, as well as the corresponding control information for creating those tactile images in the elastomeric material 100. The transform engine 600 also may include or have access to algorithms and models generally known in the art for transforming a representation or model of the tactile image into an actual tactile image in the elastomeric material 100.

The representation or model of the tactile image can be a description of the physical and tactile parameters of the tactile image, such as physical dimensions (including height, texture, and roughness). From the representation or model, the transform engine 600 determines the control parameters for each of the drivers 110, providing those parameters to the tactile interface controller 560, resulting in a realization of the representation on the elastomeric wave tactile interface 10.

In some embodiments, the representation is a visual representation, such as web page that includes one or more touch sensitive actuators. The transform engine 600 can be configured to determine the location of the touch sensitive actuator using a visual analysis of the web page, and provide the appropriate control information to the tactile interface controller 560 for realization of tactile images corresponding to the touch sensitive actuators. In some embodiments, parameters for a tactile image corresponding to the touch sensitive actuators, such as location on page, size, height, texture, are included in the computer code for rendering the web page. Using these parameters, the transform engine 600 can be arranged to determine the control information requirements for re-producing the tactile image.

The control circuit 500 may include a sensing module 620. The position and pressure of human finger(s) (or other tactile sensor) on the elastomeric wave tactile interface 10 are monitored from an analysis of the power consumed by the drivers 110. The column drivers 530 and row drivers 540 may include circuitry well understood in the art for monitoring the current flowing through each of the drivers 110 for which they maintain an electrical connection 612. When a human finger or other tactile sensor contacts the surface of the elastomeric wave tactile interface 10, some of the drivers 110 may require an increase in the current flowing through the driver 110 in order to maintain the desired tactile image. Furthermore, an increase in the contact pressure causes an even higher current flow to the drivers 110. The sensing module 620 can be configured to receive the current flow information for each of the drivers 110 from the column drivers 530 and row drivers 540, and, by monitoring the change in the current flow, detects power consumption for each driver 110. By comparing the power consumption across the entire set of drivers, the location(s) of the contact point(s) can be determined from those drivers 110 showing increased power consumption. Furthermore, the pressure at the contact point can be determined by comparing the power consumption for the drivers 110 with a baseline power consumption value for the driver 110 in an uncontacted state of the elastomeric material 100. In some embodiments, motion of the human finger or other tactile sensor can be determined by the sensor module 620 from a change in the power consumption of adjacent drivers 110 at different times. The position, pressure, and motion information can be utilized to allow the elastomeric wave tactile interface 10 to be used as a touch screen in a variety of electronic devices.

Figure 11:
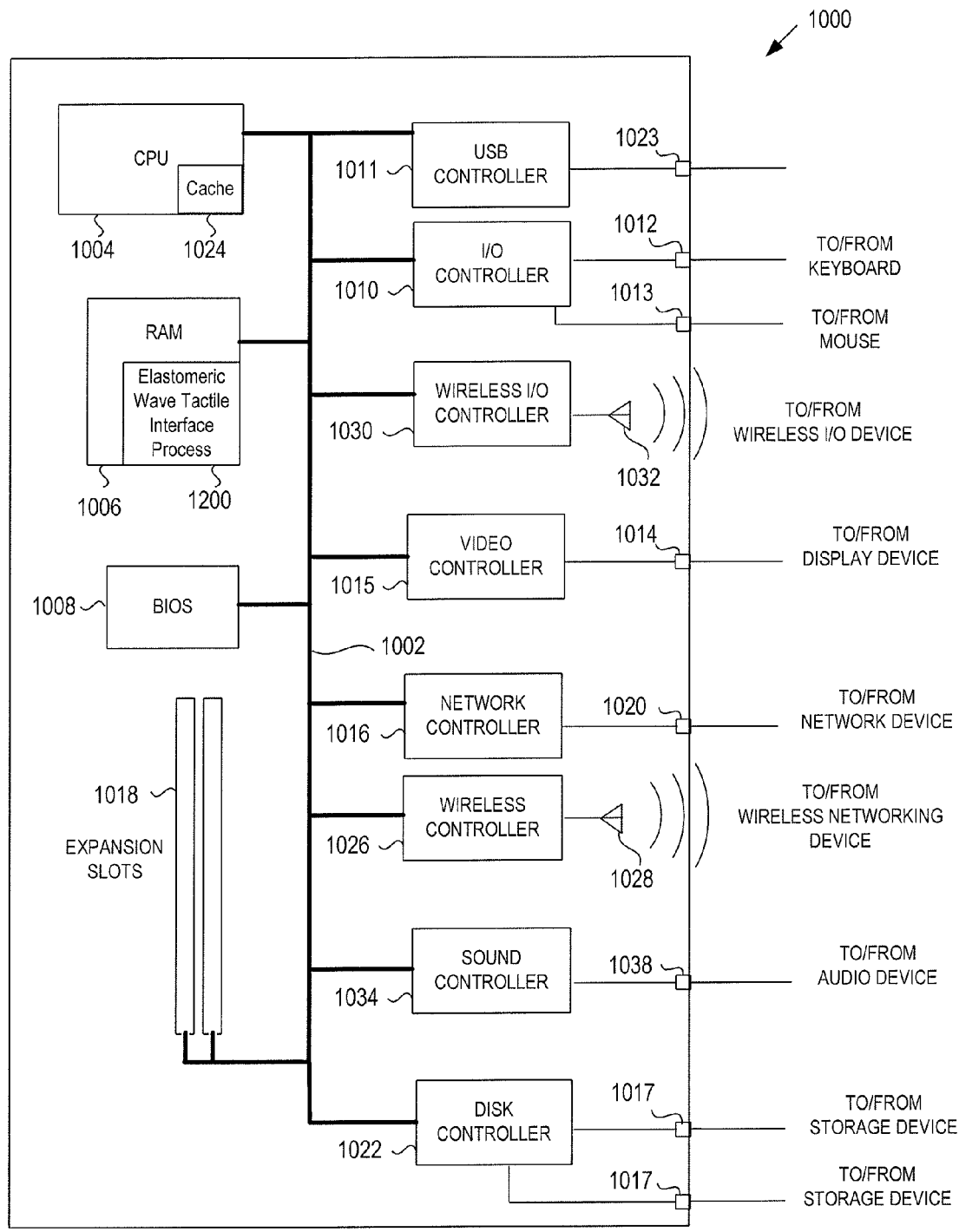
FIG. 11 is a block diagram illustrating a computer and/or architecture, all arranged in accordance with the present disclosure.

FIG. 11 is a block diagram illustrating a computer architecture or system 1000 that is arranged in accordance with the present disclosure. Example embodiments of elastomeric wave tactile interfaces 10 include a tactile interface controller 560 and a transform engine 600, which may be realized and/or implemented as illustrated by FIG. 11. A system bus 1002 transports data amongst the Central Processing Unit (CPU) 1004, RAM 1006, the Basic Input Output System (BIOS) 1008 and other components. The RAM 1006 may include an elastomeric wave tactile interface process 1200. The elastomeric wave tactile interface process 1200 may determine the control information requirements for each of the drivers 110 to produce the desired standing wave patterns or tactile images described above with reference, for example, to the transform engine 600 and FIG. 8. The RAM 1006 as shown in FIG. 11 is an example only and other aspects of the subject matter of the present disclosure could be implemented with the architecture of FIG. 11, with or without the elastomeric wave tactile interface process 1200 as shown in the RAM 1006 of FIG. 11. The CPU 1004 may include a cache memory component 1024. The computer system 1000 may include one or more external storage ports 1017 for accessing a hard disk drive, optical storage drive (e.g., CD-ROM, DVD-ROM, DVD-RW), flash memory, tape device, or other storage device (not shown). The relevant storage device(s) are coupled through the external storage port 1017 which is coupled to the system bus 1002 via a disk controller 1022. A keyboard and pointing device (e.g. mouse. touch pad) (not shown) can be coupled to the keyboard/mouse port(s) 1012, and other I/O devices could be coupled to additional I/O port(s) 1013, which are coupled to the system bus 1002 through the I/O controller 1010. Additional ports or devices, such as serial ports, parallel ports, firewire adapters, or biometric devices (not shown), may be utilized through the I/O controller 1010. A display device (not shown) can be coupled to a display device port 1014 which is coupled to the system bus 1002 through the video controller 1015. A network device (not shown), including but not limited to an Ethernet device or other device having networking capability, can be coupled to a network port 1020 which is coupled through the network controller 1016 to the system bus 1002. The computer system 1000 may be wirelessly coupled to a network device that is configured for wireless operation (not shown), including but not limited to wireless routers, using an antenna 1028 coupled to a wireless controller 1026 coupled to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be coupled to the USB port 1023 which is coupled to the system bus 1002 through the USB controller 1011. Other devices, such as cellular phones, PDAs, and other portable devices may also be coupled wirelessly via a wireless I/O antenna 1032 that is coupled to a wireless I/O controller 1030. Examples of wireless I/O technologies include, but are not limited to, Bluetooth, Infrared (IR), and Radio-Frequency (RF). Audio devices, such as microphones, speakers, or headphones may be coupled to a sound port 1038 that is coupled to a sound controller 1034 that is coupled to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply coupled to an external source of power, and/or an internal or external battery. Detailed descriptions of these devices have been omitted for convenience only and should not be construed as limiting.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A tactile interface comprising:
   a tensioned elastomeric material;
   a plurality of individually controllable drivers positioned around the perimeter of the tensioned elastomeric material; and
   driver circuitry coupled to each of the plurality of individually controllable drivers, the driver circuitry configured to receive control information for selected ones of the plurality of individually controllable drivers, and to produce a standing wave pattern in the elastomeric material by electrically modulating a subset of the plurality of individually controllable drivers at frequencies different from a steady state oscillation frequency or a harmonic of the steady state oscillation frequency.

2. The tactile interface of claim 1, further comprising a transform engine configured to determine the control information for the plurality of individually controllable drivers.

3. The tactile interface of claim 1, wherein the driver circuitry comprises a tactile interface controller, a row driver, and a column driver.

4. The tactile interface of claim 1, wherein each driver comprises:
   a first electrode having a top surface coupled to the tensioned elastomeric material;
   a second electrode; and
   a piezoelectric material disposed between a top surface of the second electrode and a bottom surface of the first electrode.

5. The tactile interface of claim 4, wherein the driver circuitry is configured to produce the standing wave pattern by applying a time-varying potential difference across the first and second electrodes of the subset of the plurality of individually controllable drivers.

6. The tactile interface of claim 5, wherein the geometric centers of the first electrode, the second electrode, and piezoelectric material of each of the plurality of individually controllable drivers are aligned along an axis.

7. The tactile interface of claim 6, wherein the time-varying potential difference produces a corresponding time-varying deformation and relaxation of the piezoelectric material in a generally perpendicular direction with respect to the surface of the elastomeric material.

8. The tactile interface of claim 1, further comprising a sensing module configured to monitor power consumption of the drivers, wherein a change in the power consumption for each of the drivers is determined by a change in electrical current to each of the drivers.

9. The tactile interface of claim 8, wherein location of an external contact with the tactile interface is determined based on an analysis of the change in power consumption for each of the driver pixels.

10. The tactile interface of claim 9, wherein pressure of an external contact with the tactile interface is determined based on an analysis of the change in power consumption for each of the driver pixels.

11. A tactile interface comprising:
    a tensioned elastomeric material;
    a plurality of individually controllable drivers positioned around the perimeter of the tensioned elastomeric material; and
    driver circuitry coupled to each of the plurality of individually controllable drivers, the driver circuitry configured to receive control information for selected ones of the plurality of individually controllable drivers, and to produce traveling waves in the elastomeric material wherein the traveling waves form a dynamic tactile image that changes position on the surface of the elastomeric material.

12. The tactile interface of claim 11, wherein the travelling waves in the elastomeric material are formed by electrically modulating a subset of the plurality of individually controllable drivers at frequencies different from a steady state oscillation frequency or a harmonic of the steady state oscillation frequency.

13. The tactile interface of claim 11, wherein each driver comprises:
    a first electrode having a top surface coupled to the tensioned elastomeric material;
    a second electrode; and
    a piezoelectric material disposed between a top surface of the second electrode and a bottom surface of the first electrode.

14. The tactile interface of claim 13, wherein the driver circuitry is configured to produce the travelling waves by applying a time-varying potential difference across the first and second electrodes of the subset of a plurality of individually controllable drivers.

15. A tactile interface comprising:
a tensioned elastomeric material; and
a plurality of individually controllable drivers positioned around the perimeter of the tensioned elastomeric material, each driver comprising:
   a first electrode having a top surface coupled to the tensioned elastomeric material,
   a second electrode supported by a base, and
   a piezoelectric material disposed between a top surface of the second electrode and a bottom surface of the first electrode,
wherein geometric centers of the first electrode, the second electrode and the piezoelectric material are offset with respect to an axis orthogonal to the top surface of the first electrode through the center of the base such that a cantilevered deflection of the piezoelectric material is produced responsive to expansive and compressive stresses on opposite surfaces of the piezoelectric material when a time-varying potential difference is applied across the first and second electrodes.

16. The tactile interface of claim 15, further comprising:
driver circuitry coupled to first and second electrodes of the plurality of individually controllable drivers, configured to receive control information for a selected one of the plurality of individually controllable drivers, and to electrically modulate a subset of the plurality of individually controllable drivers using a steady state oscillation frequency or a harmonic of the steady state oscillation frequency to produce a standing wave pattern in the tensioned elastomeric material, the standing wave pattern conveying a tactile sensation.

17. The tactile interface of claim 16, wherein the driver circuitry is configured to produce the standing wave pattern by applying a time-varying potential difference across the first and second electrodes of the subset of the plurality of individually controllable drivers.

18. The tactile interface of claim 16, further comprising a sensing module configured to monitor power consumption of the drivers, wherein a change in the power consumption for each of the drivers is determined by a change in electrical current to each of the drivers.

19. The tactile interface of claim 18, wherein at least one of location and pressure of an external contact with the tactile interface is determined based on an analysis of the change in power consumption for each of the driver pixels.

* * * * *

UNITED STATES PATENT AND TRADEMARK OFFICE
CERTIFICATE OF CORRECTION

| | | |
|---|---|---|
| PATENT NO. | : 8,581,873 B2 | Page 1 of 1 |
| APPLICATION NO. | : 13/564837 | |
| DATED | : November 12, 2013 | |
| INVENTOR(S) | : Eldering | |

It is certified that error appears in the above-identified patent and that said Letters Patent is hereby corrected as shown below:

In the Specification

In Column 1, Line 4, delete "APPLICATION" and insert -- APPLICATIONS --, therefor.

In Column 1, Line 67, delete "hereof In" and insert -- hereof. In --, therefor.

In Column 4, Line 5, delete "elastomeric material 106" and insert -- elastomeric material 100 --, therefor.

In Column 6, Line 31, delete "bottom electrode 106" and insert -- bottom electrode 108 --, therefor.

In Column 6, Line 33, delete "elastomeric material 106," and insert -- elastomeric material 100, --, therefor.

In Column 8, Lines 19-20, delete "elastomeric material 106," and insert -- elastomeric material 100, --, therefor.

In Column 10, Line 24, delete "(e.g. mouse. touch pad)" and insert -- (e.g., mouse, touch pad) --, therefor.

Signed and Sealed this
Fifteenth Day of April, 2014

Michelle K. Lee
*Deputy Director of the United States Patent and Trademark Office*